United States Patent
Iba et al.

(10) Patent No.: US 8,768,507 B2
(45) Date of Patent: Jul. 1, 2014

(54) ROBOT AND BEHAVIOR CONTROL SYSTEM FOR THE SAME

(75) Inventors: Soshi Iba, Saitama (JP); Tadaaki Hasegawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 322 days.

(21) Appl. No.: 13/237,018

(22) Filed: Sep. 20, 2011

(65) Prior Publication Data

US 2012/0078416 A1    Mar. 29, 2012

(30) Foreign Application Priority Data

Sep. 27, 2010   (JP) ................................. 2010-216043

(51) Int. Cl.
   *G05B 19/04*    (2006.01)

(52) U.S. Cl.
   USPC ............... 700/245; 700/246; 700/257; 901/1; 901/2

(58) Field of Classification Search
   USPC .................. 700/245, 246, 247, 257; 901/1, 2
   See application file for complete search history.

(56) References Cited

U.S. PATENT DOCUMENTS

| | | | |
|---|---|---|---|
| 7,139,740 B2 * | 11/2006 | Ayala | 706/26 |
| 8,078,321 B2 * | 12/2011 | Iba | 700/253 |
| 8,099,374 B2 * | 1/2012 | Iba | 706/12 |
| 8,512,415 B2 * | 8/2013 | Herr et al. | 623/24 |
| 8,527,217 B2 * | 9/2013 | Moodie | 702/41 |
| 8,660,699 B2 * | 2/2014 | Iba | 700/262 |
| 2008/0312772 A1 * | 12/2008 | Hasegawa et al. | 700/260 |
| 2009/0326679 A1 * | 12/2009 | Iba | 700/29 |
| 2009/0326710 A1 * | 12/2009 | Iba | 700/246 |
| 2011/0160908 A1 * | 6/2011 | Iba | 700/262 |
| 2011/0257764 A1 * | 10/2011 | Herr et al. | 623/24 |
| 2012/0078416 A1 * | 3/2012 | Iba et al. | 700/246 |

FOREIGN PATENT DOCUMENTS

| | | |
|---|---|---|
| JP | 2007-160428 | 6/2007 |
| JP | 2008-142861 | 6/2008 |
| JP | 2008-307640 | 12/2008 |
| JP | 2010-005761 | 1/2010 |

OTHER PUBLICATIONS

Japanese Office Action, Application No. 2010-216043, dated Aug. 20, 2013, 3 pages.

* cited by examiner

*Primary Examiner* — Thomas Black
*Assistant Examiner* — Wae Louie
(74) *Attorney, Agent, or Firm* — Rankin, Hill & Clark LLP

(57) ABSTRACT

A robot and a behavior control system for the same are capable of ensuring continued stability while carrying out a specified task by a motion of a body of the robot. Time-series changing patterns of first state variables indicating a motional state of an arm are generated according to a stochastic transition model such that at least one of the first state variables follows a first specified motion trajectory for causing the robot to carry out a specified task. Similarly, time-series changing patterns of second state variables indicating a motional state of the body are generated according to the stochastic transition model such that the second state variables satisfy a continuously stable dynamic condition.

4 Claims, 15 Drawing Sheets

ROBOT AND BEHAVIOR CONTROL SYSTEM FOR THE SAME

BACKGROUND OF THE INVENTION

1. Field of the Invention

The present invention relates to a legged mobile robot which has a body, an arm connected to the body, and a plurality of legs supporting the body, and a system which controls the behavior of the legged mobile robot.

2. Description of the Related Art

There have been proposed systems that cause a legged mobile robot to carry out a task, such as pushing a cart with its hands or hitting a ball back by a racket held in its hand (refer to Japanese Patent Application Laid-Open No. 2007-160428, Japanese Patent Application Laid-Open No. 2008-307640, and Japanese Patent Application Laid-Open No. 2010-005761).

Controlling the motion of a robot body, which includes the base body and arms, by giving priority to causing the robot to carry out a task may lead to inappropriate position and posture of the body relative to its legs in continuing stable gaits for the robot.

SUMMARY OF THE INVENTION

The present invention has been made, therefore, to mainly provide a robot capable of continuously maintaining stability while carrying out a specified task by moving its body.

The present invention relates to a robot provided with a body, an arm connected to the body, a plurality of legs supporting the body, and a behavior control system constructed to control the motion of each of the body, the arm, and the plurality of legs according to a desired motion trajectory.

To this end, a robot in accordance with the present invention has the behavior control system configured to generate time-series changing patterns of first state variables and second state variables, respectively, as the desired motion trajectories according to a stochastic transition model, which expresses the first state variables indicating a motional state of the arm and the second state variables indicating a motional state of the body, which are variation factors of the values of the first state variables, as random variables, such that at least one of the first state variables follows a first specified motion trajectory determined for the robot to carry out a specified task and the second state variables cause the robot to satisfy a continuously stable dynamic condition.

According to the robot or the control system for the same in accordance with the present invention, the time-series changing patterns of the first state variables (the first desired motion trajectories), which denote the motional state of the arm, are generated on the basis of the stochastic transition model such that at least one of the first state variables follows the first specified motion trajectory for causing the robot to carry out a specified task. Similarly, the time-series changing patterns of the second state variables (the second desired motion trajectories), which denote the motional state of the body, are generated on the basis of the stochastic transition model such that the second state variables satisfy a continuously stable dynamic condition.

The second state variables are variation factors of the values of the first state variables, so that generating the continuously stable second desired motion trajectories may make it difficult for the first state variables to closely follow the first specified motion trajectories. Meanwhile, in the stochastic transition model, the first state variables are expressed as the random variables, so that the level of follow-up (the level of observance) of at least one of the first state variables relative to the first specified motion trajectory can be flexibly adjusted under a condition that the robot carries out a specified task.

More specifically, at a time point which is relatively important in the process of causing the robot to carry out a specified task, the first state variables are required to relatively closely coincide with or approximate to the first specified motion trajectories. On the other hand, at a time point which has a relatively low level of importance, the first state variables are allowed to deviate from the first specified motion trajectories to a certain degree.

Thus, the motion of the entire robot is controlled to ensure continuous stability while carrying out the specified task by a motion of the body of the robot.

Alternatively, if the behavior control system recognizes that the first specified motion trajectory has been established to cause the robot to carry out the specified task, which involves an interaction with an object, then the desired motion trajectory may be generated according to the stochastic transition model to which a variation based on an external force applied to the robot from the object during the period of the interaction between the body and the object has been added.

According to the robot having the construction described above, the overall motion of the robot can be controlled to permit continued stability while at the same time having the robot carry out a specified task involving the interaction with the object.

The behavior control system may alternatively be configured to generate the desired motion trajectory according to the stochastic transition model in which at least one probability distribution in the random variable is expressed by a truncated distribution.

According to the robot having the construction described above, at least one probability distribution out of the state variables expressed as random variables in the stochastic transition model is expressed by a truncated distribution. The truncated distribution means a probability distribution in which a state variable value range wherein probabilities take positive values and a state variable value range wherein the probability becomes zero are adjacent to each other.

Thus, based on a structural limiting condition of the robot or a dynamic condition for stable gaits, the overall motion of the robot can be controlled to satisfy the aforesaid condition by matching the range of numerical values that cannot be taken by the aforesaid state variables with the state variable value range in which the probability becomes zero in the truncated distribution.

DESCRIPTION OF THE PREFERRED EMBODIMENTS

Construction of a Robot

First, the construction of a robot as an embodiment of the present invention will be described.

Figure 1:
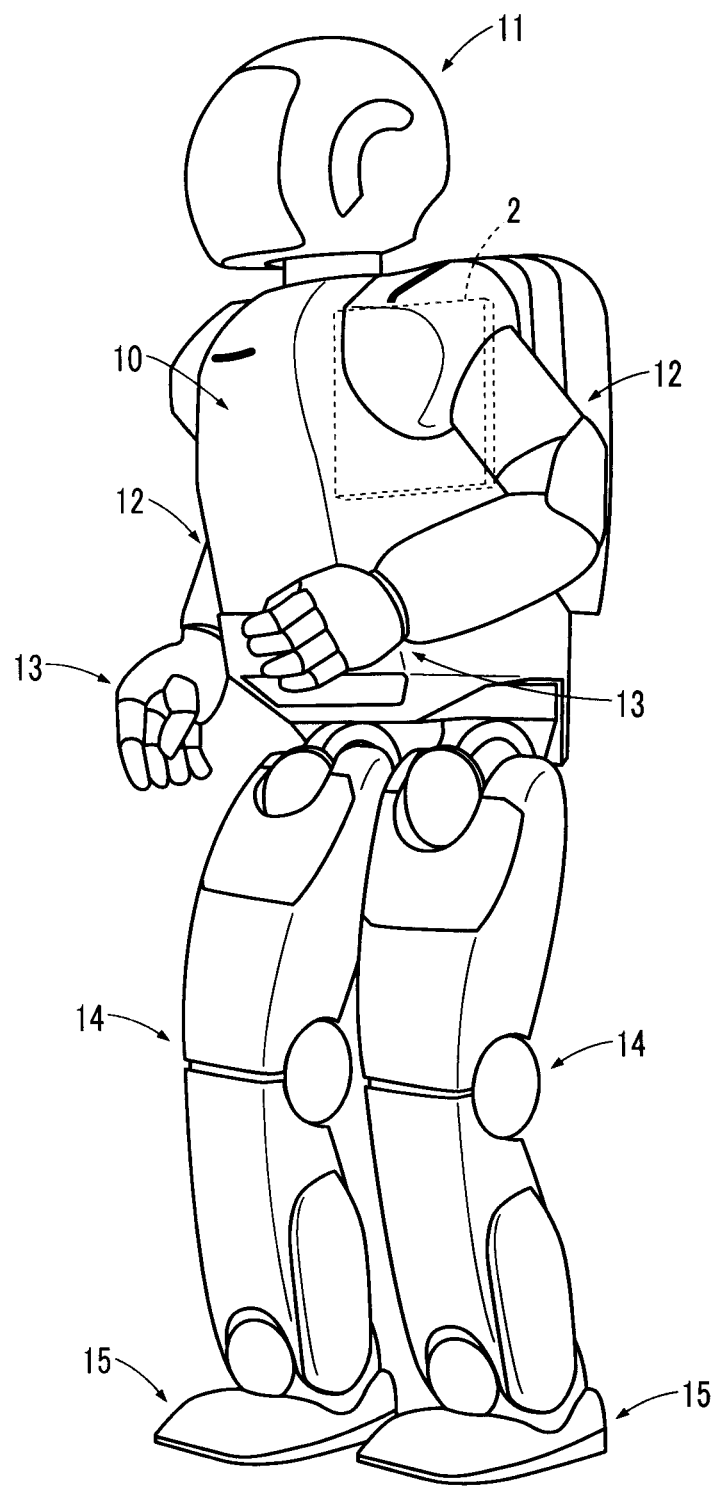
FIG. 1 is an illustration diagram of the construction of a robot as an embodiment in accordance with the present invention.

A robot 1 shown in FIG. 1 is a legged mobile robot and provided with a body 10, a head 11 mounted on the top of the body 10, right and left arms 12 extended from the right and left sides of an upper portion of the body 10, hands 13 provided at the distal ends of the arms 12, right and left legs 14 extended downward from the bottom of the body 10, and feet 15 attached to the distal ends of the legs 14, as with a human being. The robot 1 is capable of bending and stretching the arms 12 and the legs 14 at a plurality of joint mechanisms corresponding to a plurality of joints, such as shoulder joints, elbow joints, wrist joints, hip joints, knee joint, and ankle joints of a human being by forces transmitted from actuators 24.

Each of the arms 12 has a first arm link connected to the body 10 through the intermediary of a shoulder joint mechanism and a second arm link having one end thereof connected to an end of the first arm link through the intermediary of an elbow joint mechanism and the other end thereof connected to the base of the hand 13 through the intermediary of a wrist joint. Each of the shoulder joint mechanisms has two freedom degrees of rotation about a yaw axis and a pitch axis. The elbow joint mechanism has one freedom degree of rotation about the pitch axis. The wrist joint mechanism has two freedom degrees of rotation about a roll axis and the pitch axis.

Each of the legs 14 has a first leg link connected to the body 10 through the intermediary of a hip joint mechanism and a second leg link having one end connected to an end of the first leg link through the intermediary of a knee joint mechanism while the other end connected to the foot 15 through the intermediary of an ankle joint. The hip joint mechanism has three freedom degrees of rotation about the yaw axis, the pitch axis and the roll axis. The knee joint mechanism has one freedom degree of rotation about the pitch axis. The ankle joint mechanism has two freedom degrees of rotation about the pitch axis and the roll axis. The robot 1 is capable of autonomously moving by repeatedly leaving and landing the right and left legs 14 from and onto a floor.

(Configuration of a Behavior Control System)

Figure 2:
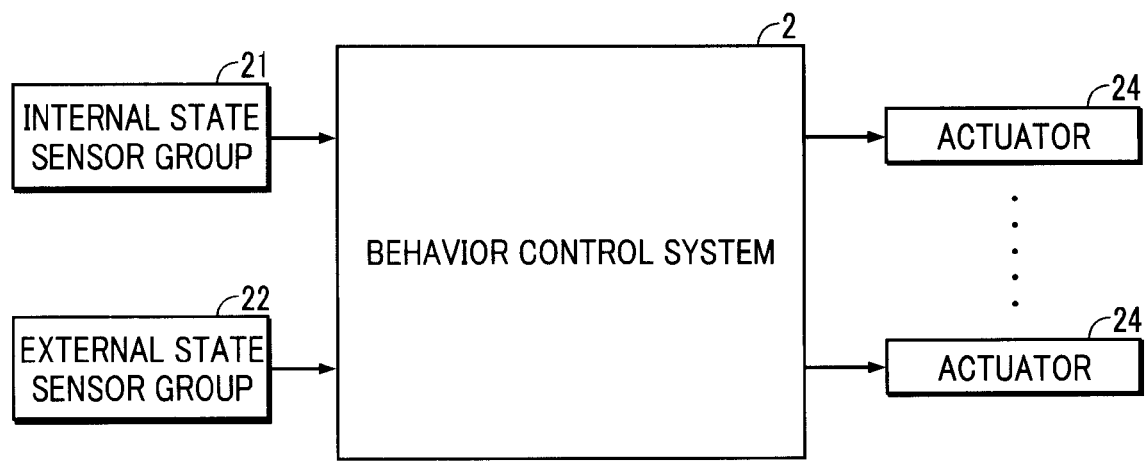
FIG. 2 is a block diagram of a control system of the robot as the embodiment in accordance with the present invention.

A behavior control system 2 illustrated in FIG. 2 is constituted of an electronic control unit, which is composed primarily of a CPU, a ROM, a RAM, and I/O circuits, or a computer, which is mounted in the robot 1.

The behavior control system 2 is configured to recognize the values of a variety of state variables on the basis of output signals from an internal state sensor group 21 and an external state sensor group 22, respectively.

The internal state sensor group 21 includes, a GPS measuring instrument for measuring the position (the position of the center of gravity) of the robot 1 or an acceleration sensor, and further, a gyro sensor for measuring the posture of the body 10, rotary encoders for measuring the bending angles or the like of joint mechanisms, and the like.

The external state sensor group 22 includes, for example, a motion capture system (not shown), which is separate from and independent of the robot 1, a stereo image sensor mounted on the head 11 to measure the positional trajectory of an object, such as a ball, related to the execution of a task, an active sensor using infrared light mounted on the body 10, and the like.

The behavior control system 2 is configured to generate the time-series changing patterns of the first state variables and the second state variables, respectively, in the form of desired motion trajectories according to a stochastic transition model, which will be discussed hereinafter. The first state variables denote the motional states of the arms 12 and the hands 13. The second state variables denote the motional states of the body of the robot 1. The behavior control system 2 is configured to control the motional modes of the robot 1 according to a desired motion trajectory by controlling the operations of the actuators 24 on the basis of the recognition results of state variables.

The phrase "the behavior control system 2 is configured" means that the behavior control system 2 reads required software and data from a storage means, such as a memory, carries out arithmetic processing on the data according to the software, generates a control command signal based on the result of the arithmetic processing, and outputs the signal to a control target, thereby fulfilling a purpose, such as controlling the behavior of the robot 1.

When a constituent device in the present invention "recognizes," it means that the constituent device executes every information processing required for the preparation to subject the information to further arithmetic processing. Such information processing includes, for example, searching information from a database, reading information from a storage, such as a memory, measuring, calculating, estimating or determining information on the basis of output signals of sensors or the like, and storing the information, which has been measured or the like, in a memory.

Some constituent devices, such as the state recognizing device 110 and the trajectory generating device 120, of the behavior control system 2 may be constructed of an external computer of the robot 1, and the rest, such as a device for controlling the behaviors of the robot 1, may be constructed of a computer capable of receiving calculation results from the external computer in a wireless or wired manner.

(Stochastic Transition Model in a First Embodiment of the Present Invention)

Figure 3:
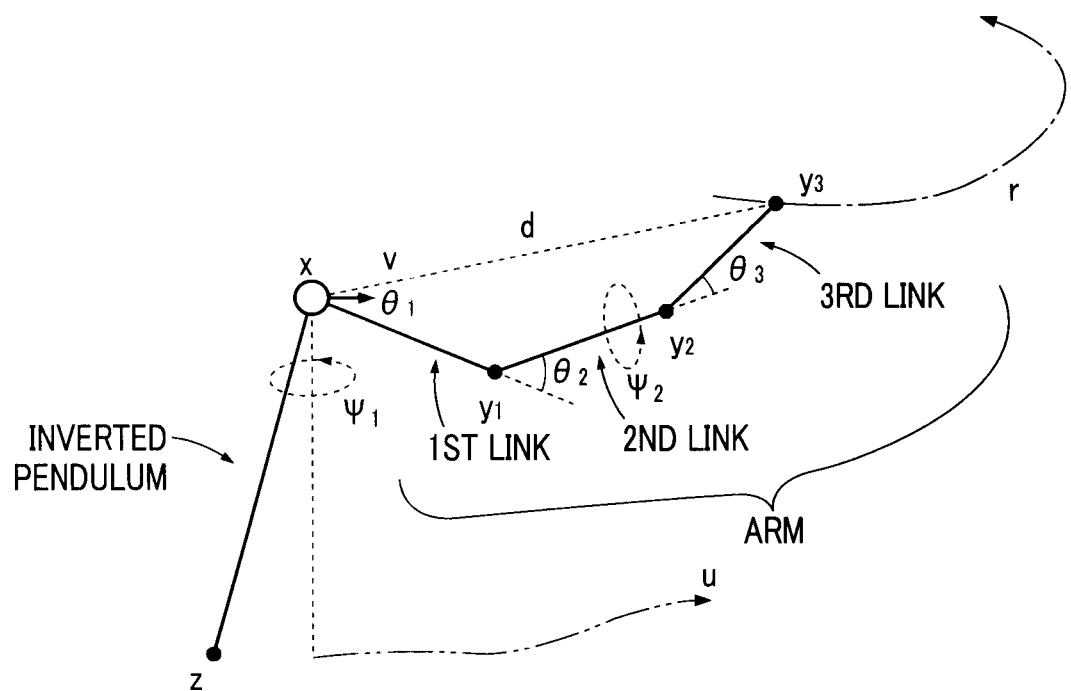
FIG. 3 is an illustration diagram of a simplified model showing a behavior of the robot.

The stochastic transition model in a first embodiment of the present invention is made on the basis of a concept that a behavior of the robot 1 is expressed in a simplified manner by the behavior of each of an inverted pendulum and an arm extended from a mass point or an upper end of the inverted pendulum, as illustrated in FIG. 3.

The inverted pendulum is assumed to have a constant height h, and assumed to be rockable about the roll axis and the pitch axis, respectively, the lower end thereof being the supporting point. The virtual desired position of the body of the robot 1 is denoted by $u=(u_x, u_y)$. The horizontal position of a ZMP of the robot 1 is denoted by the horizontal position of the lower end of the inverted pendulum $z=(z_x, z_y)$. The ZMP means a point of action obtained by replacing a normal line component of a floor reaction force applied such that the floor reaction force is distributed over the entire foot 15 by one point assumed to be subjected to the overall floor reaction force. The body mass point of the robot 1 or the horizontal position and the horizontal velocity of the shoulder joint mechanism are denoted by an upper end horizontal position of the inverted pendulum $x=(x_x, x_y)$ and an upper end horizontal velocity $v=(v_x, v_y)$, respectively.

The term "horizontal" means that the physical quantity of an object is denoted by two directional components that are perpendicular to the yaw axis of a global coordinate system. If the term "horizontal" is not added, then it means that the physical quantity of an object is denoted by three directional components of the global coordinate system that are perpendicular to each other.

The state variables (x, v) denoting the behavior states of the inverted pendulum correspond to the second state variables that denote the motional states of the body of the robot 1.

The arm is composed of three links connected in order from the upper end of the inverted pendulum. The three links correspond to a first arm link and a second arm link of the arm 12 of the robot 1, and the hand 13, respectively. The position of the elbow joint mechanism of the robot 1 is denoted by a distal end position of a first link $y_1=(y_{1x}, y_{1y}, y_{1z})$. The position of the wrist joint mechanism of the robot 1 is denoted by a distal end position of a second link $y_2=(y_{2x}, y_{2y}, y_{2z})$. The distal end position of the hand 13 of the robot 1 is denoted by a distal end position of a third link $y_3=(y_{3x}, y_{3y}, y_{3z})$.

The angles of rotation about two orthogonal axes of the shoulder joint mechanism that define the posture of the first arm link relative to the body 10 are denoted by the angles of rotation $(\theta_1, \phi_1)$ about two orthogonal axes of the first link of the arm relative to the inverted pendulum. The angle of rotation about one axis of the elbow joint mechanism that defines the posture of the second arm link relative to the first arm link is denoted by an angle of rotation $\theta_2$ about one axis of the second link relative to the first link of the arm. The angles of rotation about two orthogonal axes of the wrist joint mechanism that define the posture of the hand 13 relative to the second arm link are denoted by the angles of rotation $(\theta_3, \phi_2)$ about two orthogonal axes of the third link relative to the second link of the arm.

Regarding the behavior of the arm, a distance d from the base thereof to the distal end position thereof is considered.

The state variables $(y_1, y_2, y_3)$ indicating the behavior of the arm correspond to the first state variables indicating the motional states of the arm 12 of the robot 1.

Figure 4:
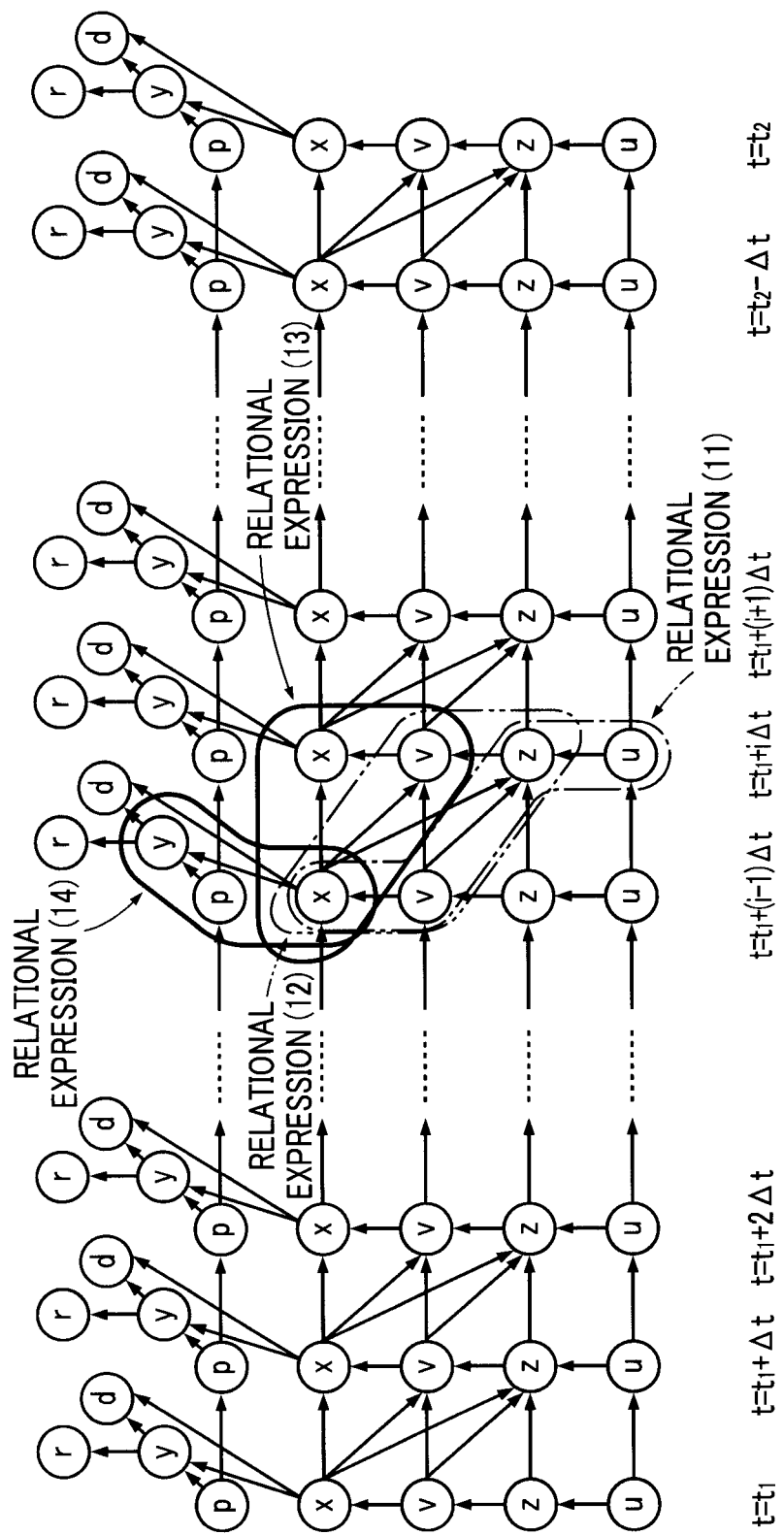
FIG. 4 is an explanatory diagram of a stochastic transition model in a first embodiment.

The stochastic transition model is expressed by the dynamics Bayesian network (DBN) shown in FIG. 4. According to the DBN, the aforesaid inverted pendulum that expresses the behaviors of the robot 1 in a simplified manner and the dynamic equations and the control laws of the arms are represented by a plurality of nodes (circles), which denote the state variables at each time point t as random variables, and the arrows which connect the nodes. The dynamic equations and the control laws of the robot 1 are represented by relational expressions (11) to (14).

$$z[i]=(-u[i]k/(k+1)+x[i-1]+v[i-1]/\omega_0)(\omega_0+k\omega_0)\Delta t/(1-\exp(-\omega_0\Delta t)) \quad (11)$$

$$v[i]=v[i-1]+\omega_0\omega_0(x[i-1]-z[i])\Delta t \quad (12)$$

$$x[i]=x[i-1]+v[i]\Delta t \quad (13)$$

$$y[i]=x[i]+DK(\theta_1,\Psi_1,\theta_2,\theta_3,\Psi_2) \quad (14)$$

Relational expression (11) indicates a control law whereby the horizontal position z of the ZMP follows the desired horizontal position trajectory u (corresponding to the second specified motion trajectory) of the body so as to prevent the robot 1 from diverging. The divergence of the robot 1 means that the balance thereof is disrupted to an extent that the robot 1 is very likely to fall. Hence, considerations are given to a divergent component to restrain the divergence. The value of the divergent component of the robot 1 is a numeric value that indicates the separation of the position of the body 10 of the robot 1 from the positions of both feet 15 (more specifically, the origin of a global coordinate system (a supporting leg coordinate system) set on the ground contact surface of a supporting leg foot 15) (refer to official gazettes related to the present applicant's ownership, such as Japanese Patents No. 3672100 and No. 3674788).

The divergent component is represented by relational expression (01) using a body mass point horizontal position x, a body mass point horizontal velocity v, and a predetermined constant (e.g., the natural frequency of the inverted pendulum) $\omega_0$.

$$\text{(Divergent component)}=x+v/\omega_0 \quad (01)$$

The horizontal position z of the ZMP of the robot 1 is represented by relational expression (02) using the desired portion trajectory u of the body, the body mass point horizontal position x, the body mass point horizontal velocity v, a feedback coefficient k, and the natural frequency of the inverted pendulum $\omega_0$.

$$z=(-u\cdot k/(k+1)+x+v/\omega_0)(\omega_0+k\cdot\omega_0)\Delta t/(1-\exp(-\omega_0\Delta t)) \quad (02)$$

The distance d from the base to the distal end position of the arm is a random variable, the probability distribution of which is represented by a truncated distribution in which the probability becomes zero outside the permissible range of the distance from the shoulder joint mechanism of the robot 1 to the distal end of the hand 13. Similarly, a joint angle denoting the posture of the arm $p=(\theta_1, \phi_1, \theta_2, \theta_3, \phi_2)$ is a random variable, the probability distribution of which is represented by a truncated distribution in which the probability becomes zero outside the permissible range of the bending angle of each joint mechanism of the arm 12 of the robot 1.

DK in the right side of relational expression (14) denotes a function indicating a forward kinematic or geometric relationship to calculate the positions of the distal ends of the first to the third links, respectively, of the arm on the basis of the joint angle p.

(Functions of the Robot and the Behavior Control System as the First Embodiment of the Present Invention)

Figure 9:
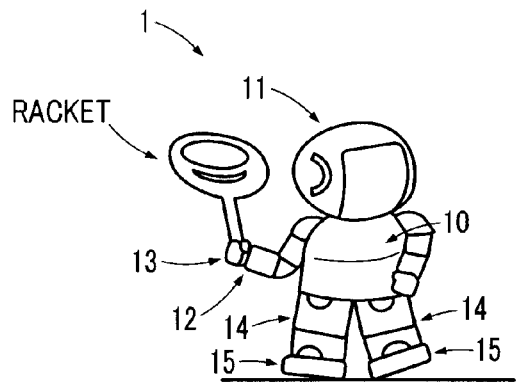
FIG. 9(a), FIG. 9(b) and FIG. 9(c) are diagrams illustrating a specified task of the robot in the first embodiment.
Figure 9:
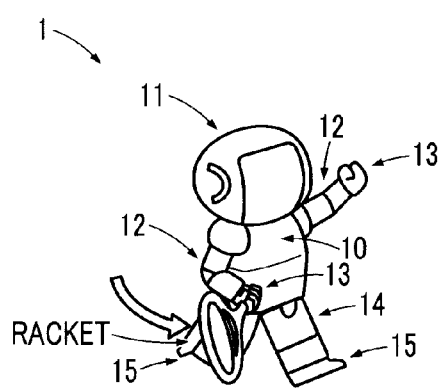
Figure 9:
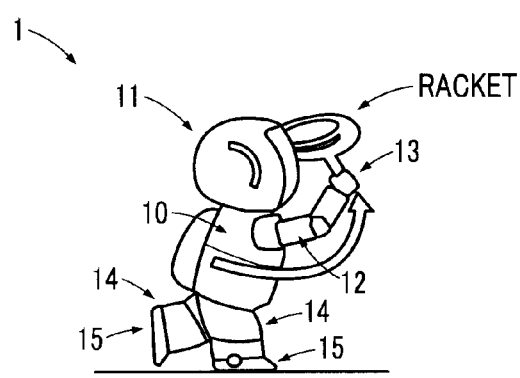

A description will be given of the functions of the robot 1 and the behavior control system 2, which have the aforesaid configurations, as the first embodiment of the present invention. According to the first embodiment of the present invention, as illustrated in FIGS. 9(a) to 9(c), the robot 1 carries out a specified task of swinging a racket held by one of the hands 13 by a forehand stroke.

Figure 5:
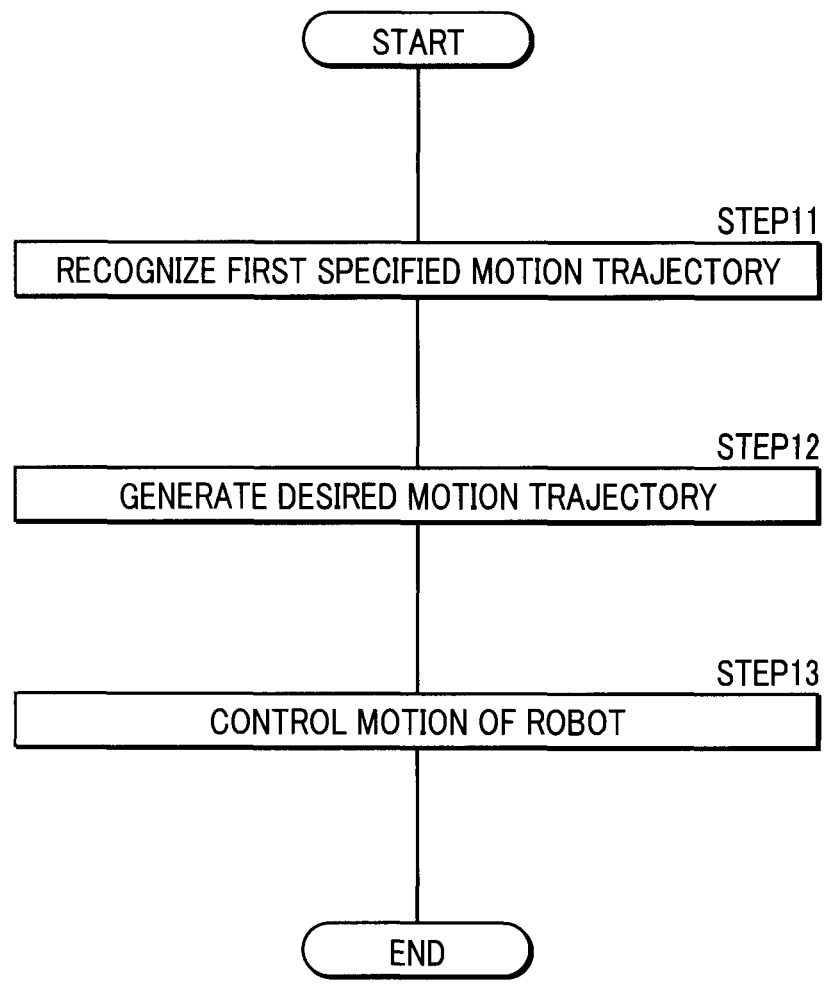
FIG. 5 is a flowchart illustrating a method for controlling the behavior of the robot in the first embodiment.

First, a first specified motion trajectory $\{r\}=[r(t_1), \ldots r(t_1+(i-1)\Delta t), r(t_1+i\Delta t), r(t_1+(i+1)\Delta t), \ldots r(t_2)]$ established to cause the robot 1 to carry out the specified task is recognized by the behavior control system 2 or a first specified motion trajectory recognizing element, which is a constituent element thereof (STEP 11 in FIG. 5).

The first specified motion trajectory $\{r\}$, i.e., the time-series exemplary changing pattern of the distal end position of the hand 13, is generated by the same technique as the technique disclosed in Japanese Patent Application Laid-Open No. 2010-005761. To be more specific, first, the time-series changing patterns of the hand positions when an instructor (human being) carries out the specified task a plurality of times are measured by an optical, mechanical, magnetic or inertial motion capture system constituting the external state sensor group 22. Then, based on the observation result, scaling on the basis of the difference in body size between the instructor and the robot 1 is performed, thereby generating the first specified motion trajectory. The first specified motion trajectory is stored in a memory device.

Alternatively, a first specified motion trajectory that has been set beforehand may be transmitted to the robot 1 from an external unit, such as a remote control device, and stored in the memory device.

Further, the first desired motion trajectory, which shows the time-series desired changing pattern of the first state variable, and the second desired motion trajectory, which shows the time-series desired changing pattern of the second state variable, are generated as the desired motion trajectories (STEP12 in FIG. 5).

More specifically, the behavior control system 2 or the desired motion trajectory recognizing element, which is a constituent element thereof, sequentially estimates N+1 nodes from a first reference time point $t=t_1$ to a second reference time point $t=t_2=t_1+N\Delta t$ according to the stochastic transition model represented by relational expressions (11) to (14). As the method for the robot 1 to estimate each node in the DBN at time point $t_1$ at which the execution of the specified task is begun, Gibbs sampling or the like is used.

Figure 6:
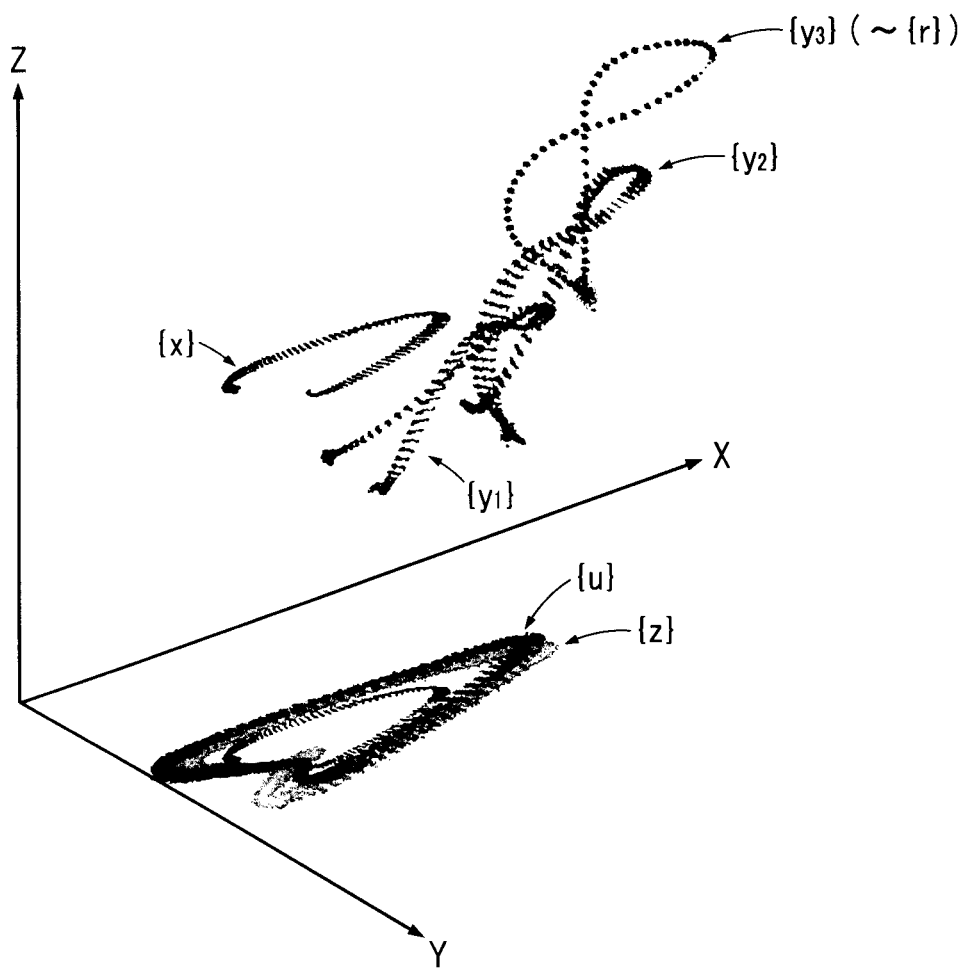
FIG. 6 is an explanatory diagram illustrating a desired motion trajectory.

Thus, a desired position trajectory $\{y_1\}$ of the elbow joint mechanism, a desired position trajectory $\{y_2\}$ of the wrist joint mechanism, and a desired position trajectory $\{y_3\}$ of the distal end of the hand 13 shown in FIG. 6 are generated as the first desired motion trajectories. The desired position trajectory $\{y_3\}$ of the distal end of the hand 13 follows the first specified motion trajectory $\{r\}$ such that it substantially coincides therewith.

Figure 7:
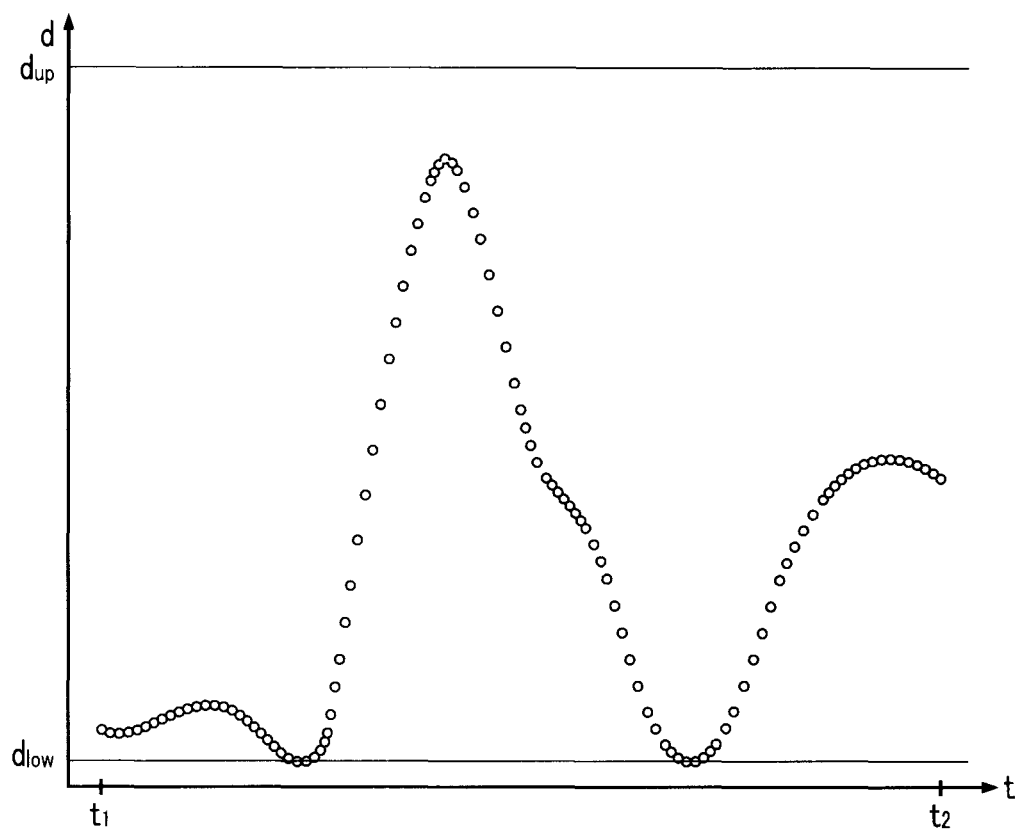
FIG. 7 is an explanatory diagram illustrating the limit of an arm length.

Further, a desired position trajectory $\{x\}$ of the body mass point or the shoulder joint mechanism and a desired horizontal position trajectory $\{z\}$ of the ZMP shown also in FIG. 6 are generated as the second desired motion trajectories. The desired motion trajectories are generated such that distance d between the shoulder joint mechanism and the hand 13 stays within a permissible range $[d_{low}, d_{up}]$, as illustrated in FIG. 7.

Figure 8:
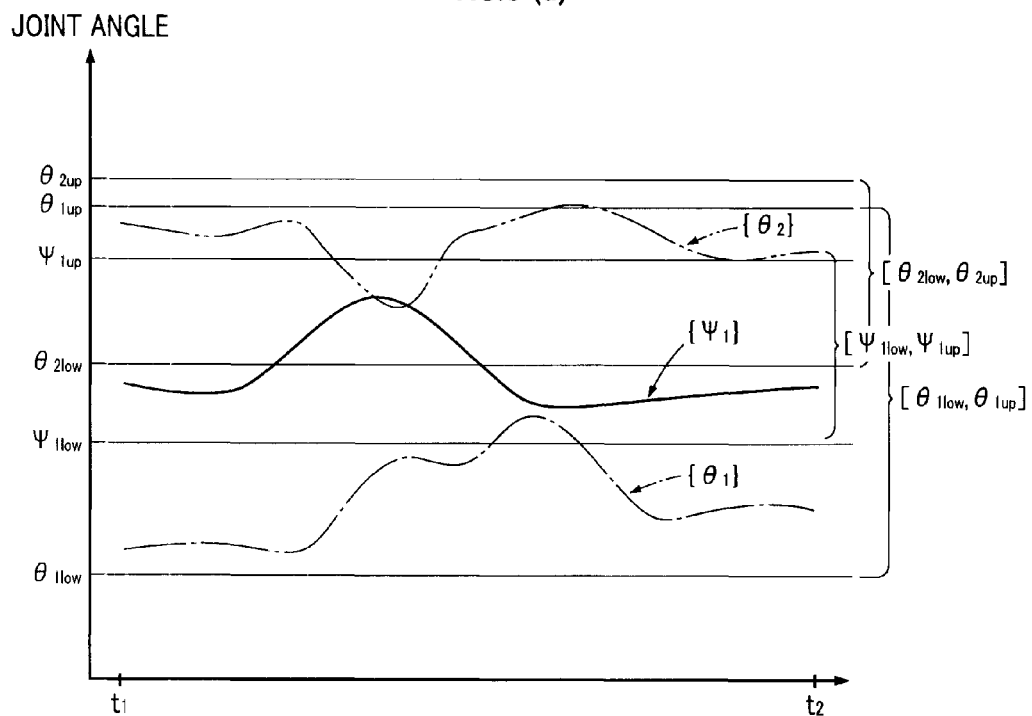
FIG. 8($a$) and FIG. 8($b$) are explanatory diagrams illustrating the limits of joint angles.
Figure 8:
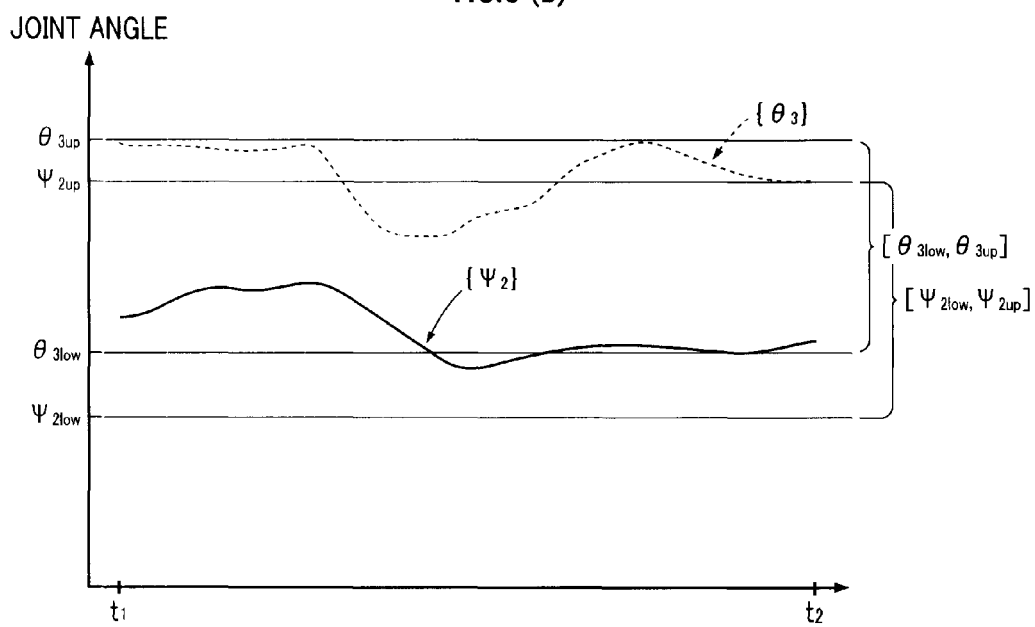

Similarly, according to the stochastic transition model, the desired motion trajectories are generated such that the angles of rotation $\theta_1$ and $\phi_1$ about the two orthogonal axes of the shoulder joint mechanism and the angle of rotation $\theta_2$ about one axis of the elbow joint mechanism stay within their permissible ranges $[\theta_{1low}, \theta_{1up}]$, $[\phi_{1low}, \phi_{1up}]$, and $[\theta_{2low}, \theta_{2up}]$, respectively, as illustrated in FIG. 8(a). Further, according to the stochastic transition model, the desired motion trajectories are generated such that the angles of rotation $\theta_3$ and $\phi_2$ about the two orthogonal axes of the wrist joint mechanism stay within their permissible ranges $[\theta_{3low}, \theta_{3up}]$ and $[\phi_{2low}, \phi_{2up}]$, respectively, as illustrated in FIG. 8(b).

This is because the distance d and the joint angles are expressed in terms of random variables, which have, as its probability distribution, the truncated distribution in which the probability becomes zero outside the permissible range in the stochastic transition model.

Subsequently, the behavior control system 2 controls the motion of the robot 1 according to the desired motion trajectories (STEP13 in FIG. 5). More specifically, the operations of the actuators 24 are controlled so as to control the motion of the entire robot 1 such that the positions of the elbow joint mechanism, the wrist joint mechanism, and the distal end of the hand 13 follow the first desired motion trajectories $\{y_1\}$, $\{y_2\}$ and $\{y_3\}$, respectively, and the positions of the shoulder joint mechanism and the ZMP follow the second desired motion trajectories $\{x\}$ and $\{z\}$, respectively.

Thus, the distal end position of the hand 13 as the first state variable changes in a time-series manner, closely following the first specified motion trajectory $\{r\}$ such that it substantially coincides therewith. More specifically, the arms 12, the legs 14 and the like are moved as illustrated in FIG. 9(a) to FIG. 9(c) in order, enabling the robot 1 to carry out the specified task of swinging forehand the racket held by one of the hands 13.

(Operations and Effects of the Robot and the Behavior Control System as the First Embodiment of the Present Invention)

According to the robot 1 or the behavior control system 2 as the first embodiment of the present invention that displays the aforesaid functions, the time-series changing pattern (the first desired motion trajectory) of the first state variable denoting the motional state of the body is generated according to the stochastic transition model such that at least one of the first state variables (the position of the hand or the position of the racket) follows the first specified motion trajectory $\{r\}$ for the robot 1 to carry out the specified task (refer to FIG. 6).

Similarly, the time-series changing pattern (the second desired motion trajectory) of the second state variable denoting the gait state of the robot 1 is generated according to the stochastic transition model such that the second state variable satisfies the dynamic condition that continuously stabilizes the robot 1 (refer to relational expression (11)).

Since the second state variable is a variation factor of the value of the first state variable, so that generating the second desired motion trajectory that continuously stabilizes the robot 1 may make it difficult for the first state variable to closely follow the first specified motion trajectory. Meanwhile, in the stochastic transition model, the first state variable is expressed as the random variable, so that the level of follow-up (the level of observance) of at least one (the position of the hand) of the first state variables relative to the first specified motion trajectory can be flexibly adjusted under a condition that the robot 1 carries out a specified task.

More specifically, at a time point which is relatively important in the process of causing the robot 1 to carry out the specified task, the first state variable is required to relatively closely coincide with or approximate to the first specified motion trajectory $\{r\}$. On the other hand, at a time point which has a relatively low level of importance, the first state variable is allowed to deviate from the first specified motion trajectory to a certain degree.

Desired motion trajectories are generated according to the stochastic transition model, in which the probability distribution of at least one of the random variables (the distance d between the shoulder joint mechanism and the distal end position of the hand, and the joint angle of the arm) is represented by a truncated distribution. Hence, based on a structural limiting condition of the robot 1 or a dynamic condition for stable gaits, the overall motion of the robot 1 can be controlled to satisfy the aforesaid condition by matching the range of numerical values that cannot be taken by the aforesaid state variables with the state variable value range in which the probability becomes zero in the truncated distribution (refer to FIG. 7 and FIGS. 8(a) and 8(b)).

(Stochastic Transition Model in a Second Embodiment of the Present Invention)

As with the first embodiment, a stochastic transition model in a second embodiment of the present invention is made on the basis of a concept that a behavior of the robot 1 is expressed in a simplified manner by the behavior of each of an inverted pendulum and an arm, as illustrated in FIG. 3. The second embodiment differs from the first embodiment in that, in order to cause the robot 1 to carry out a specified task that involves an interaction with an object, a force applied to the robot 1 from the object by the interaction is taken into account.

The aforesaid difference is reflected by a stochastic transition model represented by new relational expression (21) in place of relational expression (11) representing a stochastic transition model. In expression (21), a result e obtained by converting a force f applied to the robot 1 from an object while carrying out a specified task into a ZMP-equivalent quantity has been added to the right side.

$$z[i] = (-u[i]k/(k+1) + x[i-1] + v[i-1]/\omega_0) \quad (21)$$
$$(\omega_0 + k\omega_0)\Delta t/(1 - \exp(-\omega_0\Delta t)) + e$$
$$= z[i] = (-u[i]k/(k+1) + x[i-1] + v[i-1]/\omega_0)$$
$$(\omega_0 + k\omega_0)\Delta t/(1 - \exp(-\omega_0\Delta t)) + fh/mg$$

where h denotes the height of the inverted pendulum, m denotes the mass of the inverted pendulum, and g denotes the gravitational acceleration.

(Functions of the Robot and the Behavior Control System as the Second Embodiment of the Present Invention)

A description will be given of the functions of the robot 1 and the behavior control system 2, which have the aforesaid configurations, as the second embodiment of the present invention. According to the second embodiment of the present invention, as illustrated in FIGS. 12(*a*) to 12(*c*), the robot 1 carries out a specified task of swinging a racket held by one of the hands 13 by a forehand stroke to hit a ball (object) back.

Because of the nature of the specified task, the racket is regarded as a part of the hand 13. In a stochastic transition model, the position of the gut of the racket (the portion where the ball is hit) held by the hand 13 (the position of the racket) is handled as a distal end position x of the hand 13.

Figure 11:
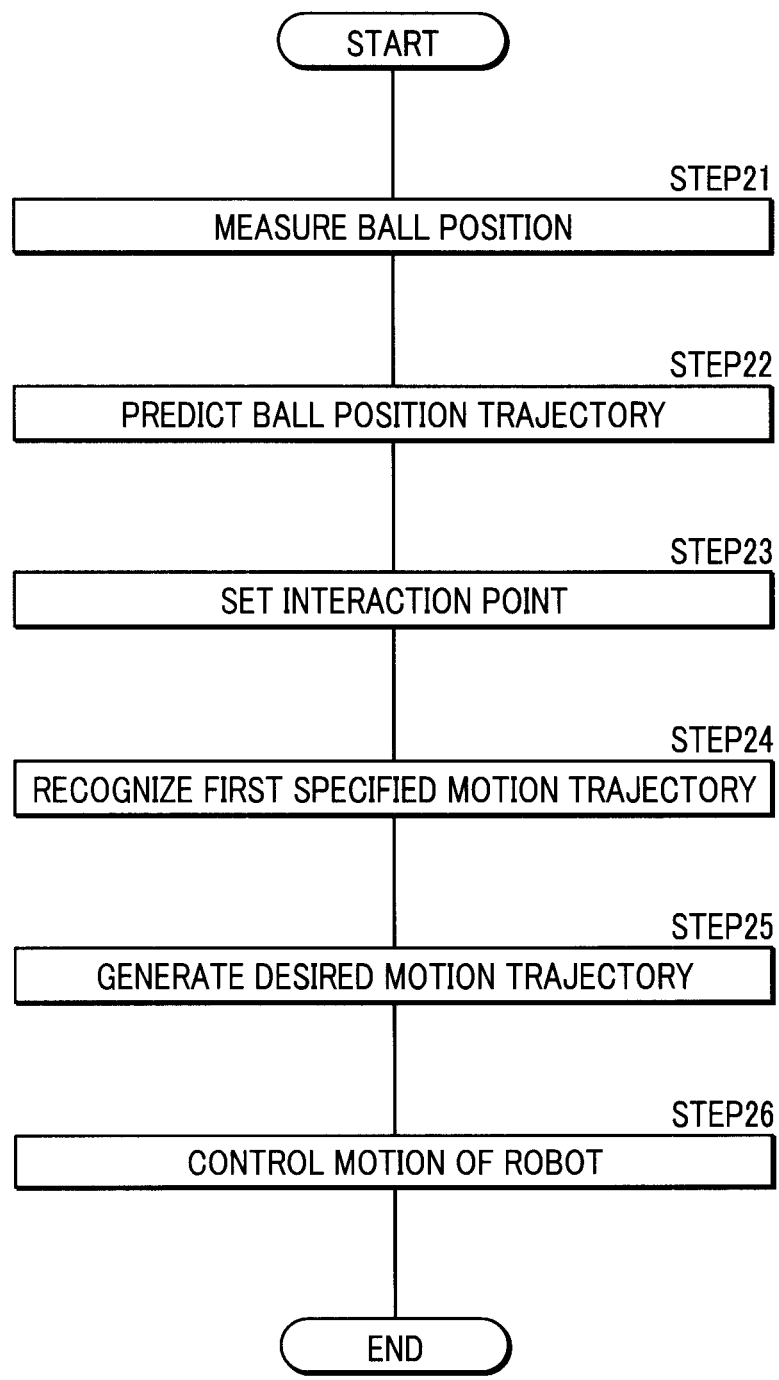
FIG. 11 is a flowchart illustrating a method for controlling the behavior of a robot in the second embodiment.
Figure 12:
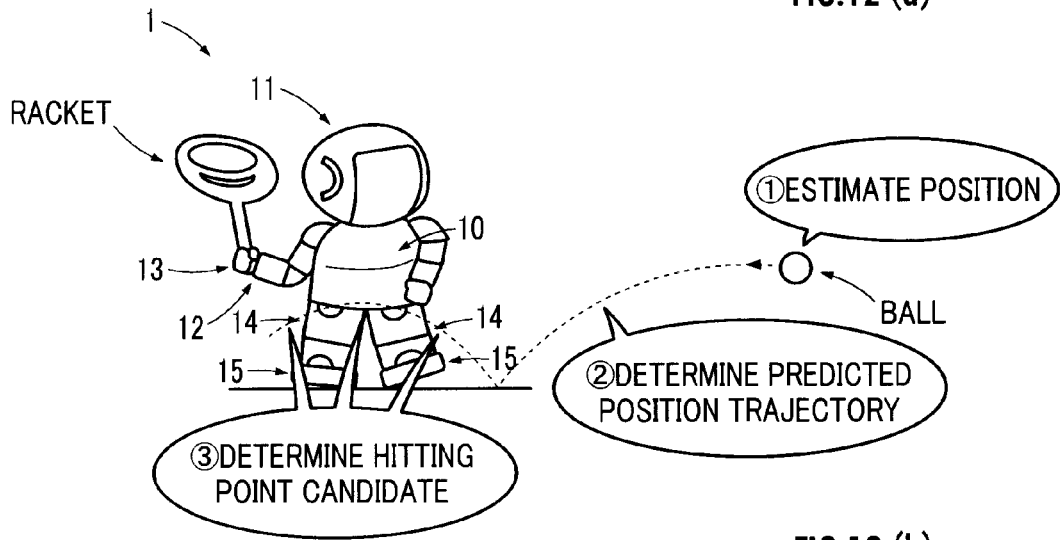
FIG. 12(a), FIG. 12(b) and FIG. 12(c) are diagrams illustrating a specified task of the robot in the second embodiment.
Figure 12:
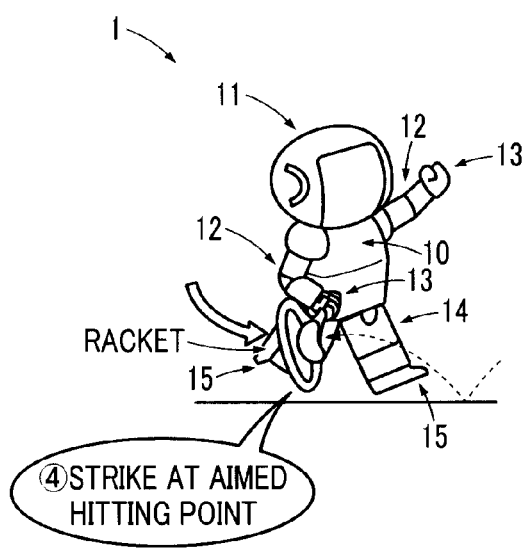
Figure 12:
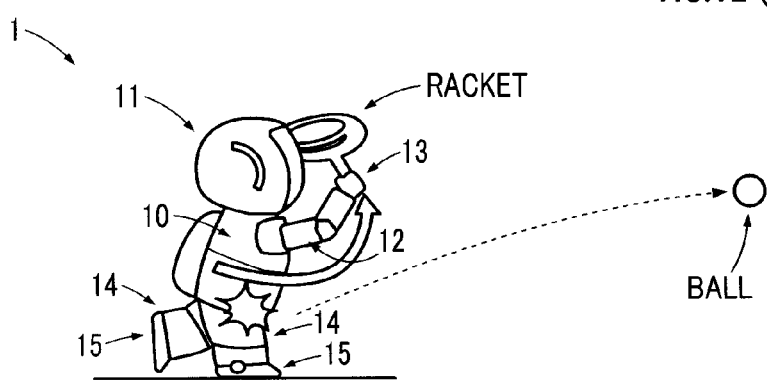

First, the behavior control system 2 or a ball position trajectory measuring element, which is a constituent element thereof measures in a time-series manner the position of the ball in a world coordinate system or a robot coordinate system on the basis of the time-series position of the ball indicated by output signals of the external state sensor group 22 (refer to STEP21 in FIG. 11 and FIG. 12(*a*)).

Subsequently, the behavior control system 2 or a ball position trajectory predicting element, which is a constituent element thereof, predicts the position trajectory of the ball on the basis of a time-series estimated position $x_1(k)$ of the ball (refer to STEP22 in FIG. 11 and the dashed line in FIG. 12(*a*)). A predicted position $x_1(t)$ of the ball is calculated according to a dynamic equation on the basis of the measured position $x_1(k)$ and a velocity $v_1(k)=\{x_1(k)-x_1(k-1)\}/\Delta t$ and an acceleration $\alpha_1(k)=\{v_1(k)-v_1(k-1)\}/\Delta t$ ($\Delta t$: arithmetic cycle) of the ball at current time k.

Further, the behavior control system 2 or an interaction point candidate setting element, which is a constituent element thereof, sets an interaction point or a hitting point of the racket and the ball within a range that can be reached by the racket, i.e., the gut thereof, by a motion of the robot 1 (refer to STEP23 in FIG. 11 and FIG. 12(*a*)).

The range that can be reached by the racket is estimated according to a kinematics calculation method on the basis of the bending angles of the joint mechanisms indicated by output signals of the internal state sensor group 21 and the kinematic parameters, such as the position and the posture, of the racket relative to the hand 13. In estimating the range that can be reached by the racket, it is confirmed that different portions of the robot 1, including the body 10 and the arms 12, will not interfere or contact with each other.

The position of the racket in a hand coordinate system, the position and the posture of which are fixed relative to the palm of the hand 13, may be set in advance, or may be sequentially calculated on the basis of the racket gripping position and posture relative to the hand 13 imaged by an image-taking device constituting the internal state sensor group 21.

Further, the behavior control system 2 recognizes the first specified motion trajectory {r} indicating a time-series exemplary position trajectory of the racket position as the first state variable established to cause the robot 1 to carry out the specified task (STEP24 in FIG. 11). For example, a first specified motion trajectory that passes a set interaction point at predicted time at which the ball reaches is selected from among a plurality of first specified motion trajectories stored in the memory device.

Further, a first desired motion trajectory indicating a time-series desired changing pattern of a first state variable and a second desired motion trajectory indicating a time-series desired changing pattern of a second state variable are generated as desired motion trajectories (STEP25 in FIG. 11 (refer to FIG. 6)).

Figure 10:
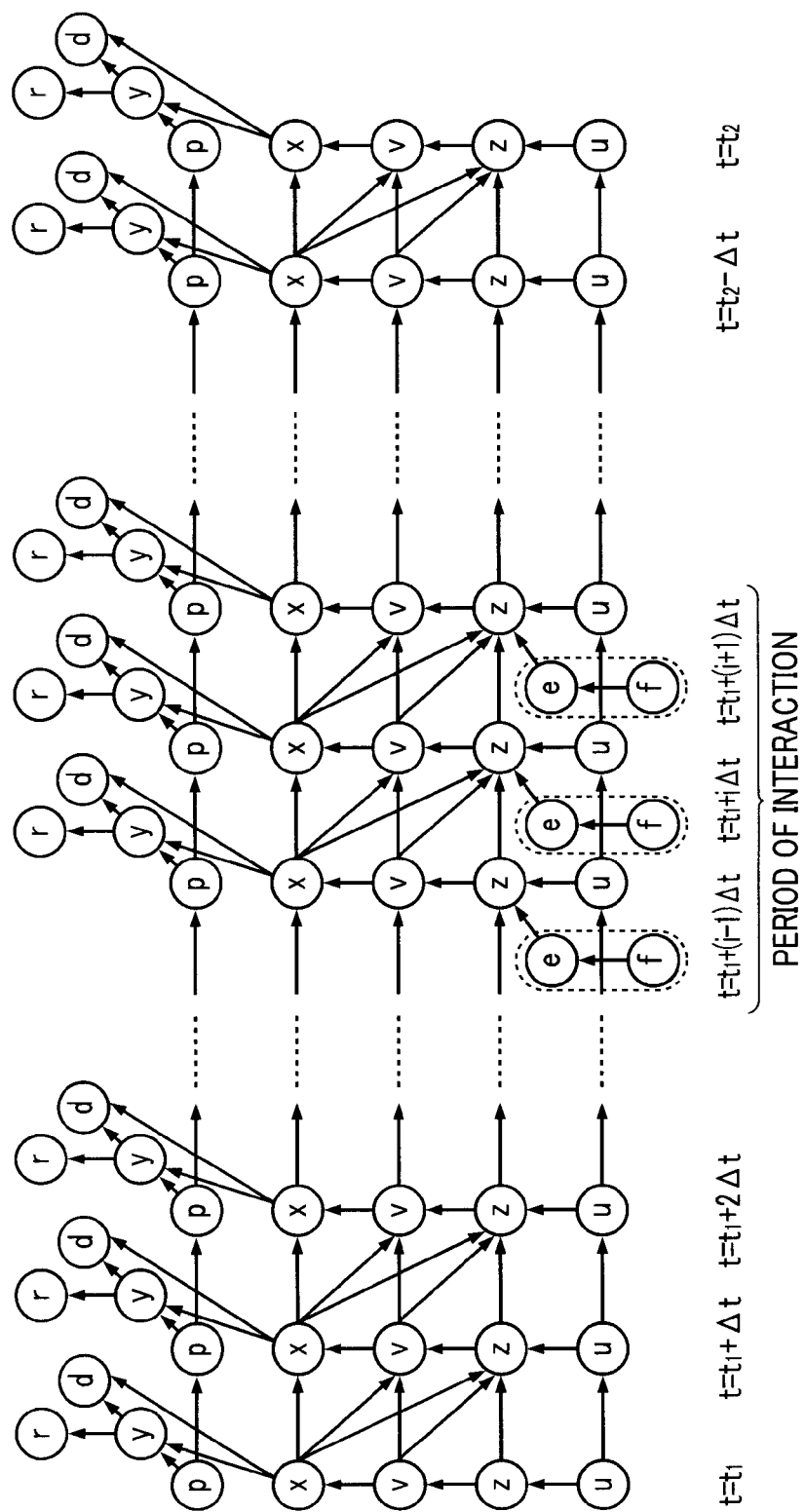
FIG. 10 is an explanatory diagram of a stochastic transition model in a second embodiment.

More specifically, the behavior control system 2 or a desired motion trajectory recognizing element, which is a constituent element thereof, sequentially estimates N+1 nodes from a first reference time point $t=t_1$ to a second reference time point $t=t_2=t_1+N\Delta t$ according to a stochastic transition model. At this time, as illustrated in FIG. 10, nodes that denote the force f and the ZMP-conversion result e thereof are added at least during the period of the interaction of the racket and the ball in the DBN indicating the stochastic transition model.

Subsequently, the behavior control system 2 controls the motion of the robot 1 according to the desired motion trajectories (STEP26 in FIG. 11). More specifically, the operations of the actuators 24 are controlled so as to control the motion of the entire robot 1 such that the positions of the elbow joint mechanism, the wrist joint mechanism, and the racket follow the first desired motion trajectories $\{y_1\}$, $\{y_2\}$ and $\{y_3\}$, respectively, and the positions of the shoulder joint mechanism and the ZMP follow the second desired motion trajectories $\{x\}$ and $\{z\}$, respectively.

Thus, the racket position as the first state variable changes in a time-series manner, closely following the first specified motion trajectory {r} such that it substantially coincides therewith. More specifically, the arms 12, the legs 14 and the like are moved as illustrated in FIG. 12(*a*) to FIG. 12(*c*) in order, enabling the robot 1 to carry out the specified task of swinging forehand the racket held by one of the hands 13 to hit the ball back.

Other specified tasks involving steady interactions between the body and an object, such as walking while pushing an object, can be carried out in addition to a specified task that involves a temporary interaction between the body and an object, including a specified task of catching an object, such as a ball, coming toward the robot 1 by the hand or hands 13 thereof.

(Operations and Effects of the Robot and the Behavior Control System as the Second Embodiment of the Present Invention)

The robot 1 or the behavior control system 2 as the second embodiment of the present invention displaying the functions described above provides the same operations and effects as those of the first embodiment of the present invention. In addition, during the period of the interaction in the specified task involving the interaction between the body (racket) and the object (ball), desired motion trajectories are generated according to a stochastic transition model in which a variation e based on an external force f applied to the robot 1 from the ball is added to at least one (a horizontal position z of the ZMP) of the second state variables (refer to relational expression (21) and FIG. 10).

Thus, the overall motion of the robot 1 can be controlled so as to continue stable gaits while at the same carrying out a specified task involving the interaction with an object by a motion of the body of the robot 1 (refer to FIG. 12(*a*) to FIG. 12(*c*)).

Another Embodiment of the Present Invention

Figure 13:
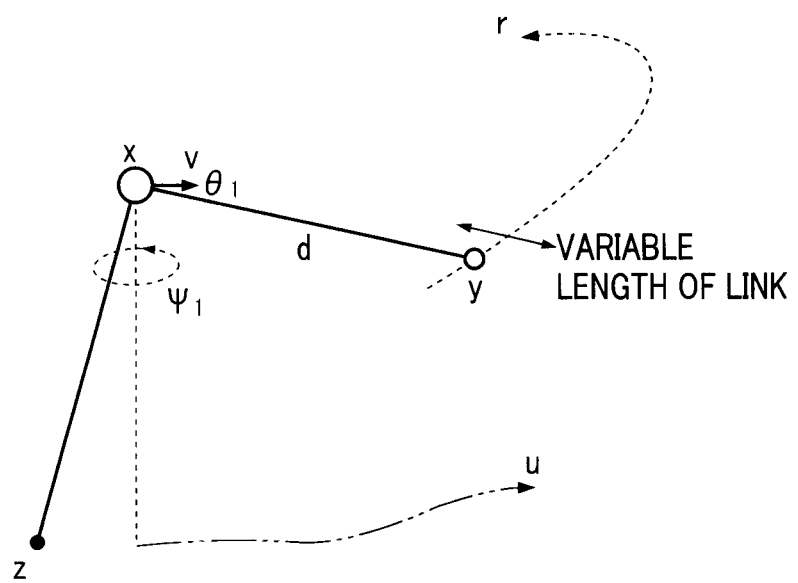
FIG. 13 is an illustration diagram of another simplified model showing a behavior of a robot.

A stochastic transition model in another embodiment of the present invention is built on the basis of the concept that the behaviors of a robot 1 are expressed in a simplified manner by the behaviors of an inverted pendulum illustrated in FIG. 13 and an arm extended from the mass point or the upper end of the inverted pendulum, as with the first and the second embodiments. This embodiment differs from the first and the second embodiments in that the arm thereof is straight and a length d thereof is variable.

Figure 14:
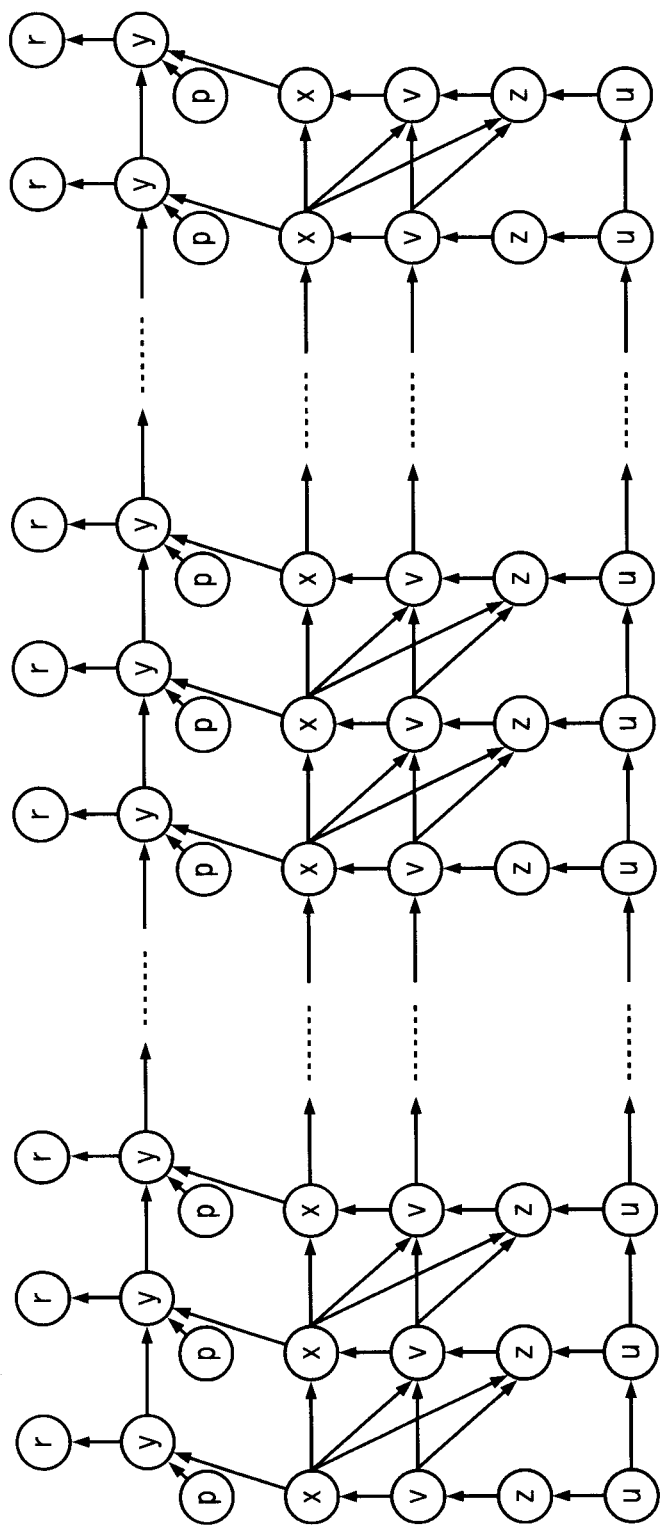
FIG. 14 is an explanatory diagram illustrating a stochastic transition model in another embodiment.

The stochastic transition model in this case is expressed by a dynamics Bayesian network (DBN) illustrated in FIG. 14. Relational expression (34) is applied in place of relational expression (14) representing the dynamic equation and the control law of the robot 1 in the first embodiment.

$$y[i]=x[i]+DK(\theta_1, \psi_1) \quad (34)$$

Figure 15:
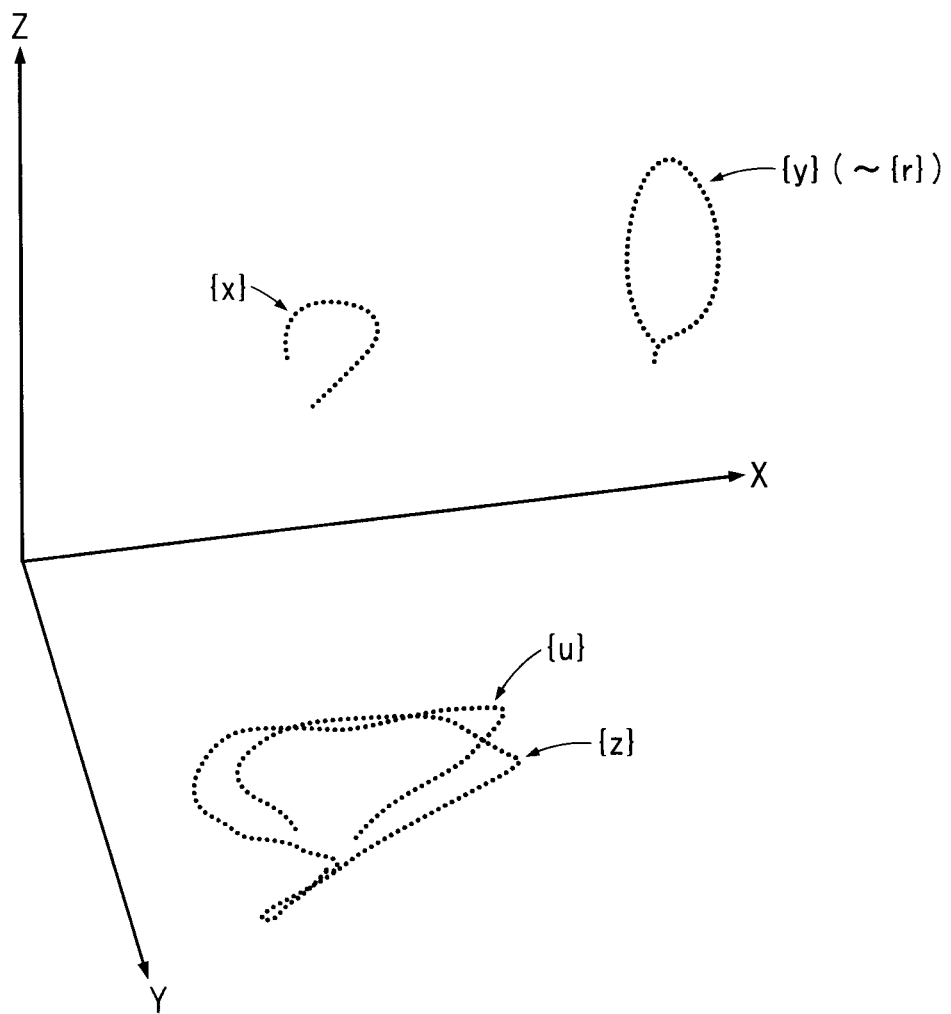
FIG. 15 is an explanatory diagram illustrating a desired motion trajectory in another embodiment.

Thus, a desired position trajectory {y} of the distal end of a hand 13 illustrated in FIG. 15 is generated as a first desired motion trajectory. The desired position trajectory {y} of the distal end of the hand 13 follows a first specified motion trajectory {r} such that it substantially coincides therewith.

Similarly, a desired position trajectory {x} of a body mass point or a shoulder joint mechanism and a desired horizontal position trajectory {z} of a ZMP illustrated in FIG. 15 are generated as second desired motion trajectories. It is seen from FIG. 15 that the desired horizontal position trajectory {z} changes, following a desired horizontal position trajectory {u} of a virtual ZMP as a second specified motion trajectory.

Then, a behavior control system 2 controls the operations of actuators 24 such that the position of the distal end of the hand 13 follows the first desired motion trajectory {y} and the positions of the shoulder joint mechanism and the ZMP follow the second desired motion trajectories {x} and {z}, respectively, thereby controlling the motion of the entire robot 1. The operations of an elbow joint mechanism and a wrist joint mechanism can be controlled to cause the robot 1 to carry out a specified task according to an inverse kinematics model that makes it possible to calculate the rotational angle of each of the elbow joint mechanism, the wrist joint mechanism and the like from the position of the shoulder joint mechanism, the position of a hand and the like.

What is claimed is:

1. A robot comprising:
a body;
an arm connected to the body;
a plurality of legs supporting the body; and
a behavior control system constructed to control the motion of each of the body, the arm, and the plurality of legs according to desired motion trajectories,
wherein the behavior control system is configured to generate time-series changing patterns of first state variables and second state variables, respectively, as desired motion trajectories according to a stochastic transition model, which expresses the first state variables indicating a motional state of the arm and the second state variables indicating a motional state of the body, which are variation factors of the values of the first state variables, as random variables, such that at least one of the first state variables follows a first specified motion trajectory determined for the robot to carry out a specified task and the second state variables cause the robot to satisfy a continuously stable dynamic condition.

2. The robot according to claim 1, wherein
the behavior control system is configured such that, in the case where it is recognized that the first specified motion trajectory has been established to cause the robot to carry out the specified task involving an interaction with an object, the desired motion trajectory is generated according to the stochastic transition model to which a variation based on an external force applied to the robot from the object during the period of the interaction between the body and the object is added.

3. The robot according to claim 1, wherein
the behavior control system is configured to generate the desired motion trajectory according to the stochastic transition model in which a probability distribution of at least one of random variables is expressed by a truncated distribution.

4. A behavior control method for controlling a robot including a body, an arm connected to the body, a plurality of legs supporting the body, the method comprising:
generating time-series changing patterns of first state variables and second state variables, respectively, as desired motion trajectories according to a stochastic transition model, which expresses the first state variables indicating a motional state of the arm and the second state variables indicating a motional state of the body, which are variation factors of the values of the first state variables, as random variables, such that at least one of the first state variables follows a first specified motion trajectory determined for the robot to carry out a specified task and the second state variables cause the robot to satisfy a continuously stable dynamic condition; and
controlling the motion of each of the body, the arm, and the plurality of legs according to the desired motion trajectories.

* * * * *